United States Patent [19]
Johnson, III

[11] Patent Number: 4,466,811
[45] Date of Patent: Aug. 21, 1984

[54] MOLECULAR VELOCITY VECTOR BIASING METHOD AND APPARATUS FOR GASES

[76] Inventor: Herbert E. Johnson, III, 851 14th St., Boulder, Colo. 80302

[21] Appl. No.: 406,433

[22] Filed: Aug. 9, 1982

[51] Int. Cl.³ .............................................. B01D 59/18
[52] U.S. Cl. .......................................... 55/17; 55/66; 55/389
[58] Field of Search .................... 55/17, 66, 277, 389

[56] References Cited

U.S. PATENT DOCUMENTS

| | | | |
|---|---|---|---|
| 3,677,844 | 7/1972 | Fleischer et al. | 55/389 X |
| 3,713,921 | 1/1973 | Fleischer et al. | 55/389 X |
| 3,813,856 | 6/1974 | Jensen | 55/17 X |
| 4,084,943 | 4/1978 | Hamel et al. | 55/17 |
| 4,147,480 | 4/1979 | Deutsch | 417/572 |
| 4,147,481 | 4/1979 | Deutsch | 417/572 |
| 4,255,404 | 3/1981 | Chen | 55/17 X |
| 4,280,909 | 7/1981 | Deutsch | 417/572 X |
| 4,284,418 | 8/1981 | Andres | 55/66 X |

FOREIGN PATENT DOCUMENTS

| | | | |
|---|---|---|---|
| 2013990 | 10/1971 | Fed. Rep. of Germany | 55/17 |
| 2900689 | 7/1980 | Fed. Rep. of Germany | 55/17 |

OTHER PUBLICATIONS

"Can the Second Law of Thermodynamics be Circumvented?", American Laboratory, May, 1981, pp. 54, 56, 58–62, 64, 65.

"Molecular Scattering at the Solid Surface," Recent Research in Molecular Beams, pp. 145–156.

Primary Examiner—Robert H. Spitzer
Attorney, Agent, or Firm—Fields, Lewis, Pittenger & Rost

[57] ABSTRACT

A biasing member (11) having opposed faces (11a, 11b) with a matrix of tapered holes (19) which provide a plurality of closely spaced, inclined biasing surfaces (12) is disposed in the path of a flowing gas. The gas molecules rebound from the biasing surfaces to upset the normal velocity distribution so that more molecules of gas have greater velocity components along the centerline of the holes in the general direction of gas flow when the biasing surfaces are divergingly inclined and more molecules of gas have reduced velocity components in the direction of gas flow when the surfaces are convergingly inclined in relation to the direction of gas flow. The beneficial results are an increase in the velocity of a flowing gas and thrust forces on the biasing member in the opposite direction to gas flow and, in the alternative, a reverse in the direction of gas flow through the biasing member reduces the velocity.

17 Claims, 8 Drawing Figures

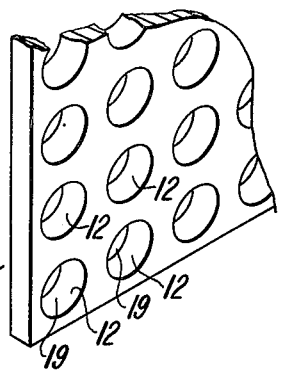
Fig_1
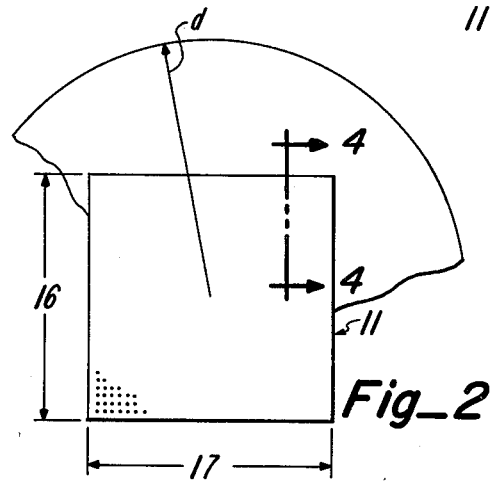
Fig_2
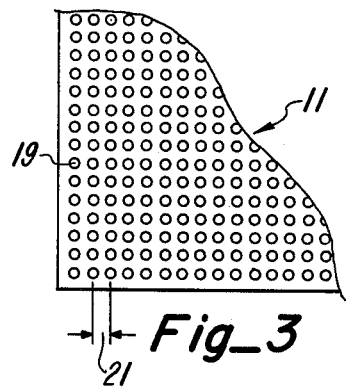
Fig_3
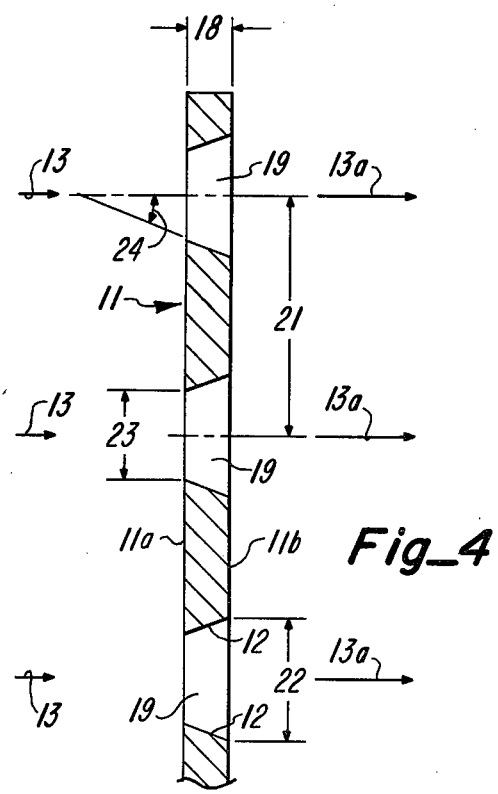
Fig_4

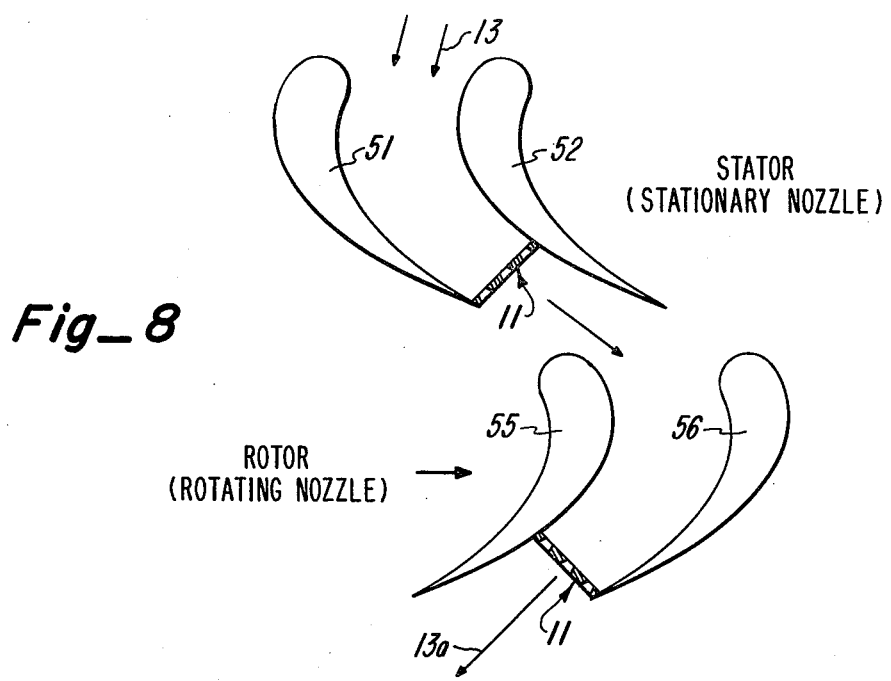
Fig_8
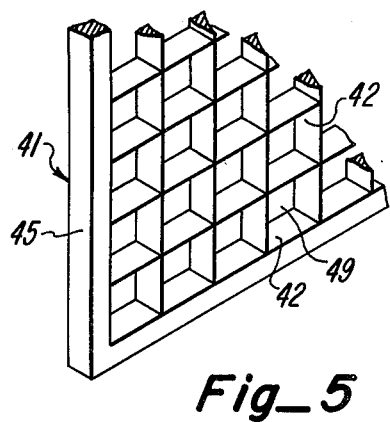
Fig_5
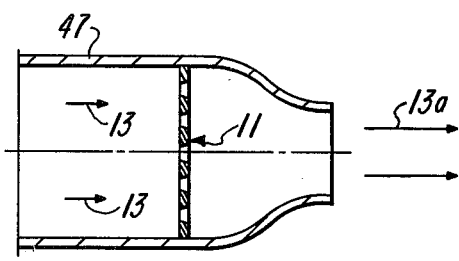
Fig_6
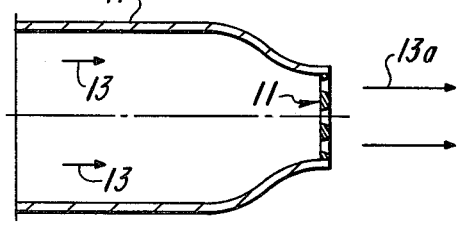
Fig_7

MOLECULAR VELOCITY VECTOR BIASING METHOD AND APPARATUS FOR GASES

TECHNICAL FIELD

This invention relates to a novel method and apparatus for altering the normal distribution of gas molecule vectors in a flowing gas which is useful for changing the velocity of the flowing gas and exerting thrust forces on a biasing member through which the gas is passed.

BACKGROUND ART

In Deutsch patent Nos. 4,147,480, 4,147,481 and 4,280,909 there is disclosed a member having generally tapered voids or holes extending therethrough to enhance flow of fluids. The Deutsch device is made possible by using commercially available filters which have hole sizes which approach gas molecule sized diameters and which have been tapered by etching on one end to provide the taper. Statistically, gas molecules can enter the large end of the hole more easily than the small end and the flow is enhanced in the direction from the large end to the small end. Deutsch refers to this as the "Edge Effect" in an article entitled "Can the Second Law of Thermodynamics Be Circumvented?," *American Laboratory*, May, 1981. Deutsch discloses that the tapered voids make possible very favorable effusional resistances and thus should be very useful in decreasing or possibly eliminating the energy required to circulate fluids. The member of Deutsch has a ratio of hole size to gas molecule diameter which is relatively low and the gas flow is from the large end to the small end of the hole.

The conventional flat-plate metering orifice is commonly used for measuring fluid flow. This orifice consists of a flat plate with a single, carefully machined hole extending therethrough, usually about half the diameter of the pipe in which the orifice is located. Pressure taps are installed upstream and downstream of the orifice at prescribed distances and a differential pressure gauge is installed between the two taps. The measured diameters of the pipe and orifice, combined with the differential pressure measurement, are the principle quantities used to calculate the mass rate of flow of a given fluid.

The metering orifice is usually made with a short cylindrical section and then the trailing edge is beveled at an angle of 45°. The cylindrical section has a length of 0.01 to 0.02 times the pipe diameter, which is so short it is often considered a knife edge. The short cylindrical section is used so that the diameter of this section will accurately relate to the flow, which would not be the case if the orifice were a long cylinder. The beveled trailing edge makes it possible to use a thicker orifice plate, which is more resistant to distortion, and still have a short cylindrical hole with a square leading edge.

The angle on the beveled portion of a metering orifice must be only large enough for the flow to separate from it; otherwise the angle on the bevel is not critical. A conventional flat-plate metering orifice even as small as 10 mm has a hole surface area to hole volume ratio that is approximately two orders of magnitude smaller than that of the present invention and further is not arranged in pluralities to provide a high density of biasing surfaces for altering the distribution of gas molecule vectors.

There are no known prior art methods or apparatus that are specifically directed to upsetting or altering the normal molecular velocity vector distribution of a flowing gas so that more molecules go in the direction of gas flow. This may also be referred to as biasing or vectoring more gas molecules in the direction of flow.

DISCLOSURE OF INVENTION

The molecular velocity vector distribution of the gas molecules in a flowing gas is changed by the positioning of a sheet-like member with a matrix of closely spaced tapered holes which provide a plurality of closely spaced, inclined biasing surfaces in the path of a flowing gas to upset the normal distribution in such a way as to change the velocity of the gas flow as a result of the gas molecules rebounding from the biasing surfaces. This results in an increase in the velocity of the gas and produces a thrust in the opposite direction on the member through which the gas is passed or, alternatively, may decrease the velocity of the gas if the gas is passed through the member in a reverse direction.

BRIEF DESCRIPTION OF DRAWINGS

The details of this invention will be described in connection with the accompanying drawings, in which:

FIG. 1 is a perspective view of a fragment of a biasing member having a matrix of conically shaped holes;

FIG. 2 is a side elevational view of the biasing member shown in FIG. 1;

FIG. 3 is an enlarged fragment of a corner of the biasing member shown in FIG. 2;

FIG. 4 is a sectional view taken along lines 4—4 of FIG. 2;

FIG. 5 is a perspective view of a fragment of another form of biasing member having a matrix of pyramidal holes;

FIG. 6 is a side elevational view partially in section of the biasing member in the wider entry end of a nozzle;

FIG. 7 is a side elevational view partially in section of the biasing member at the narrower exit end of a nozzle; and FIG. 8 is a partial circumferential sectional view of the biasing member in a turboexpander stage.

DETAILED DESCRIPTION

Referring now to the drawings, in FIGS. 1-4 there is shown biasing apparatus comprised of a sheet-like biasing member 11 having opposed faces 11a and 11b. A matrix of tapered holes 19 extends between the opposed faces to provide a plurality of closely spaced, inclined biasing surfaces 12. A stream of gas is shown as being passed through the holes from a smaller opening 23 in one face to a larger opening 22 in the opposite face, as indicated by a velocity vector 13. The stream of gas passed in the direction shown increases in velocity and would decrease in velocity if passed in the reverse direction. The tapered holes are conically shaped and arranged to be divergingly inclined in relation to the direction of the gas flow to increase the velocity of the gas. The holes in the illustrative embodiment have a selected height dimension designated 16, a selected width dimension 17, and a selected thickness dimension 18, and a matrix of rows and columns of the holes is formed in the member.

For reference purposes, the spacing dimension between the holes is designated by numeral 21, the larger diameter opening by numeral 22, and the smaller diameter opening by numeral 23. The angle of the biasing surfaces in relation to the centerline of the hole is designated by numeral 24.

In accordance with the present invention, a biasing member 11 was made from a sheet of brass having a thickness of 0.038 mm. The sheet was in a 41.2 mm diameter circle, designated d on the drawing, to fit in a pipe or like conduit with a hole matrix which has a height dimension, designated by numeral 16, of 20 mm and a width dimension, designated by numeral 17, of 20 mm. The acute angle for the surface in relation to the centerline of the hole was 20°. A total of 10,201 holes 19 were drilled in this sheet. These holes had a large end diameter of 0.1 mm and a small end diameter of 0.072 mm. The spacing between holes was 0.2 mm.

A conventional blower fan was used to generate airflow through the holes in the sheet in the direction shown by arrow 13. An increased component of gas velocity in the direction of the centerline of the hole was detected when the gas was passed in the direction where the surfaces was divergingly inclined (smaller to larger) and a decreased component of gas velocity in the direction of the centerline of the hole was detected when the surfaces were convergingly inclined (larger to smaller). These velocity changes were detected by a pitot tube.

The increase in velocity of the gas in the direction of the centerline of the hole as a result of the use of the plurality of biasing surfaces above described may be further explained by a consideration of some of the known characteristics of gas molecules.

A gas in a static, closed system will reach an equilibrium state where the molecules have a Maxwellian velocity vector distribution such that any imaginary plane passed through the gas would see a cosine law distribution of velocity approaching and leaving the plane on either side of the plane. If the gas flows through an open system, the Maxwellian velocity vector distribution will have an added velocity vector in the direction of flow. The resultant velocity vector distribution would persist unless it was affected by stationary or moving solid surfaces.

The biasing member 11 is arranged to be either stationary or moving with the small diameter of opening 23 of the tapered hole faced upstream. As the gas enters the small diameter opening 23 of the hole, the Maxwellian velocity vector distribution plus an axial velocity component in the direction of flow exists. As the molecules at the outer edges of the jet strike and rebound from the biasing surfaces 12, the molecules leave with the cosine law distribution but the molecules are centered around a normal to the inclined biasing surface rather than a normal to the centerline of the hole and of the entering gas flow. This means that a portion of the rebounding flow has greater components of velocity in the forward flow direction than before and the rest of the rebounding flow has reduced components in the backward flow direction. As long as previously unaffected molecules rebound from the inclined biasing surfaces there is a continuing increase of the velocity vector components in the forward direction. At the time of the impact of the molecule on the inclined biasing surfaces there is an increase of momentum in the forward direction and therefore there is also a thrust to the member with the biasing surfaces in the opposite direction.

The gas flow leaving the biasing surfaces is joined downstream where the radial components, shortened by the inclined surfaces, tend to balance each other out as they do in equilibrium flow. The added forward components persist for a time as a non-equilibrium state if the member 11 is stationary. If the biasing member is moving toward the left from that shown, then a portion of the added forward components is removed. As the flow continues the forward components attributable to the non-equilibrium condition gradually die out as intermolecular collisions return the gas to an equilibrium Maxwellian velocity vector distribution plus the equilibrium forward velocity components. Again, the gas flow in a reverse direction from that shown in the drawings would decrease the velocity of the gas flow and exert a thrust on the biasing member in the opposite direction.

Studies conducted by F. C. Hurlbut have established that gas molecules rebounding from surfaces retain no memory of the incident direction and the rebounding is diffuse following the cosine law of distribution. Hurlbut describes this in an article entitled "Molecular Scattering at the Solid Surface," *Recent Research in Molecular Beams*, pages 145–156. The cosine law of distribution for molecules rebounding from a surface may be stated as the probability of a gas molecule rebounding from a surface at a given angle is proportional to the cosine of the angle measured from the normal to the surface. In other words, the probability of rebounding normal or perpendicular to the surface is proportional to 1.0, the probability of rebounding at 45° is 0.707, and the probability of rebounding at 90° is zero.

The physical characteristics of biasing apparatus according to the present invention are summarized below:

|  | Range | Example |
|---|---|---|
| Hole size | 1.00 mm to 0.01 mm | 0.072 mm Small diam. 0.1 mm Large diam. |
| Wall thickness | 0.001 mm to 5.0 mm | 0.038 mm |
| Average hole diam. to surface thickness ratio | — | 2.26:1 |
| Surface angle | 5° to 30° | 20° |
| Hole spacing C to C | 1× to 5 × hole diam. | 2× hole diam. |
| Large hole end diam. to $N_2$ molecule diam. ratio | $2.7 \times 10^4$ to $2.7 \times 10^6$:1 | $2.7 \times 10^5$:1 |
| Hole surface to volume ratio | 5 to 500:1 $\frac{1}{mm}$ | 50:1 $\frac{1}{mm}$ |

The physical characteristics of the Deutsch patents and the conventional small orifice above discussed are summarized below:

| | Deutsch Patents | |
|---|---|---|
| | Range | Example |
| Hole size | 0.1 mm to 0.000001 mm | 0.000015 mm av. diam. |
| Wall thickness | 0.000001 mm to 1000 mm | 0.010 mm |
| Average hole diam. to surface thickness ratio | — | 0.0015:1 |
| Surface angle | 10° to 160° (included angle) | — |
| Hole spacing C to C | — | — |
| Large hole end diam. to $N_2$ | $2.7 \times 10^5$ to 2.7:1 | 40:1 |

| | -continued | |
|---|---|---|
| molecule diam. ratio | | |
| Hole surface to volume ratio | 40 to 4 × 10⁶:1 $\frac{1}{mm}$ | 2.67 × 10⁵:1 $\frac{1}{mm}$ |

| Small Orifice | |
|---|---|
| Hole size | 10 mm |
| Wall thickness | 2.4 mm |
| Average hole diameter to surface thickness ratio | 4.2:1 |
| Surface angle | 45° |
| Hole spacing C to C | Not applicable |
| Large hole end diam. to N₂ molecule diam. ratio | 2.7 × 10⁷:1 |
| Hole surface to volume ratio | 0.40:1 $\frac{1}{mm}$ |

An alternative form of biasing apparatus 41 shown in FIG. 5 has a thin sheet-like member 45 with a matrix of pyramidal holes which provide a plurality of closely spaced, inclined, biasing surfaces 42 for each hole 49 arranged in a square configuration. This shaping and a closer arrangement of holes provide a higher density of biasing surfaces and thereby a more active biasing member than the circular holes above described.

Other biasing surface configurations may be formed by rectangular, hexagonal, n-sided polygons, or irregular closed paths.

In FIG. 6 the biasing member 11 above described is shown in the large area entrance of a nozzle 47. The gas flow, indicated by arrows 13, increases in velocity as it passes through the nozzle more than it would for the nozzle without the biasing member 11, as shown by the larger velocity arrows 13a. In FIG. 7 the biasing member 11 is located in the narrow end of the nozzle and again the velocity of the air is shown to increase more than for the conventional nozzle as a result of passing through the biasing member.

Another application for the present invention is in a turboexpander stage having a row of stationary nozzle vanes, two of which are shown as 51 and 52, with the member located at the outlet end and a row of rotary blades 55 and 56 with the member 11 located at the outlet end thereof to increase the output torque from the rotor.

Other applications for which the biasing apparatus may be used include turbocompressors to decrease the required input torque, ducted flow through fixed or rotary wings to increase lift and provide thrust, displacement expanders to increase work transfer to the piston, displacement compressors to decrease work transfer from the piston, heat transfer augmentation devices, and low friction flow devices.

Although the present invention has been described with a certain degree of particularity, it is understood that the present disclosure has been made by way of example and that changes in details of structure may be made without departing from the spirit thereof.

What is claimed is:

1. Biasing apparatus for changing the direction of molecular velocity vectors of a flowing gas comprising:
   a biasing member having opposed faces with a matrix of tapered holes, each said hole extending from a smaller opening in one face to a larger opening in the opposite face to provide a plurality of closely spaced biasing surfaces which are divergingly inclined in relation to the centerline of the hole to increase the velocity of the gas flow through the hole to bias the molecular velocity distribution of the gas molecules in the direction of the gas flow through each hole as a result of said gas molecules rebounding from said surfaces in a diffuse pattern according to the cosine law of distribution with the directions substantially centered along a line normal to the inclined surface for increasing the velocity of gas flow along the centerline of the hole and exerting a thrust on said member in the opposite direction,
   said opposed faces of said biasing member being closed to gas flow between said tapered holes,
   said tapered holes having a diameter in the range of about 0.01 mm to 1.0 mm, a center to center distance in the range of about one to five times hole diameter, and an average hole diameter greater than hole length.

2. Biasing apparatus as set forth in claim 1 wherein the inclined surfaces for each hole are relatively close together having a ratio of surface area to enclosed volume in the range of 5 to 500:1 l/mm.

3. Biasing apparatus as set forth in claim 1 wherein the inclined surfaces for each hole are relatively close together having a ratio of hole surface are to enclosed volume of about 50:1 l/mm.

4. Biasing apparatus as set forth in claim 1 wherein said angle of incline for said biasing surfaces is about 20° C. relative to the centerline of the hole.

5. Biasing apparatus as set forth in claim 1 wherein said angle of incline for said biasing surfaces is in the range of about 5° to 30° relative to the centerline of the hole.

6. Biasing apparatus as set forth in claim 1 wherein said member has a thickness of about 0.038 mm.

7. Biasing apparatus as set forth in claim 1 wherein said member has a thickness in the range of about 0.001 mm to 5.0 mm.

8. Biasing apparatus as set forth in claim 1 wherein said tapered holes have a smaller diameter of about 0.072 mm and a larger diameter of about 0.1 mm and a center to center distance of about one times hole diameter.

9. Biasing apparatus as set forth in claim 1 wherein said biasing surface for each hole is in the shape of a circle.

10. Biasing apparatus as set forth in claim 1 wherein said biasing surface for each hole is in the shape of a square.

11. Biasing apparatus as set forth in claim 1 wherein said biasing surface for each hole is in the shape of a rectangle.

12. Biasing apparatus as set forth in claim 1 wherein said biasing surface for each hole is in the shape of a hexagon.

13. Biasing apparatus as set forth in claim 1 wherein said biasing surface for each hole is in the shape of an n-sided polygon.

14. Biasing apparatus as set forth in claim 1 wherein the average hole diameter to hole length ratio is greater than one to one.

15. Biasing apparatus for changing the direction of the molecular velocity vectors of a flowing gas comprising:
   a sheet-like biasing member having opposed faces with a matrix of tapered holes, each said hole extending from a smaller opening in one face to a larger opening in the opposite face to provide a plurality of closely spaced biasing surfaces, said member having a thickness in the range of about 0.001 mm to 5.0 mm, said holes having a diameter in the range of about 0.01 mm to 1.0 mm, said opposed faces of said biasing member being closed to gas flow between said tapered holes, said biasing surfaces being inclined at an angle of about 5° to 30° in relation to the centerline of the hole, a ratio of surface area to enclosed volume in the range of about 5 to 500:1, a center to center hole spacing of one times the hole diameter, and an average hole diameter greater than hole length to bias the molecular velocity vector distribution of the gas molecules in the direction of gas flow through each hole as a result of said gas molecules rebounding from said surfaces in a diffuse pattern according to the cosine law of distribution with the directions centered along a line normal to the inclined surfaces for increasing the velocity of gas flow along the centerline of the hole and exerting a thrust on said member in the opposite direction.

16. A biasing method for changing the direction of the molecular velocity vectors of a flowing gas comprising the steps of:

positioning a plurality of inclined surfaces provided by a biasing member having opposed faces with a matrix of tapered holes, each said hole extending from a smaller opening in one face to a larger opening in the opposite face, in the path of said stream of gas flow to bias the molecular velocity vector distribution of said stream of flowing gas to increase the velocity of said gas flow when the surface is divergingly inclined and decrease the velocity when the gas flow is convergingly inclined, said opposed faces of said biasing member being closed to gas flow between said tapered holes, said tapered holes having a diameter in the range of about 0.01 mm to 1.0 mm, a center to center distance in the range of about one to five times hole diameter, and an average hole diameter greater than hole length.

17. A biasing method as set forth in claim 16 wherein said flowing gas is directed in a path coaxial with said smaller and larger openings in entering and leaving said holes.

* * * * *